United States Patent

Fernandez et al.

[11] Patent Number: 5,818,582
[45] Date of Patent: Oct. 6, 1998

[54] APPARATUS AND METHOD FOR PHASE FLUOROMETRY

[75] Inventors: Salvador M. Fernandez, Hartford; Ernest St. Louis, Manchester; Ralph Levy, West Hartford; Ernest F. Gulgon, Canton; Sean Cobane, Norwich, all of Conn.

[73] Assignee: Ciencia, Inc., East Hartford, Conn.

[21] Appl. No.: 818,881

[22] Filed: Mar. 17, 1997

Related U.S. Application Data

[60] Provisional application No. 60/026,495, Sep. 19, 1996.

[51] Int. Cl.⁶ .................................................. G01J 3/30
[52] U.S. Cl. ..................... 356/318; 250/458.1; 250/459.1
[58] Field of Search ..................................... 356/318, 317, 356/417; 250/458.1, 459.1, 461.1, 461.2

[56] References Cited

U.S. PATENT DOCUMENTS

| | | |
|---|---|---|
| 4,500,641 | 2/1985 | van den Engh et al. . |
| 4,650,336 | 3/1987 | Moll . |
| 4,654,532 | 3/1987 | Hirschfeld . |
| 4,799,756 | 1/1989 | Hirschfeld . |
| 4,804,849 | 2/1989 | Booth et al. . |
| 4,895,156 | 1/1990 | Schulze . |
| 4,937,457 | 6/1990 | Mitchell . |
| 5,014,225 | 5/1991 | Vidaver et al. . |
| 5,130,545 | 7/1992 | Lussier . |
| 5,151,869 | 9/1992 | Alcala . |
| 5,196,709 | 3/1993 | Berndt et al. . |
| 5,212,386 | 5/1993 | Gratton et al. . |
| 5,257,202 | 10/1993 | Feddersen et al. . |
| 5,317,162 | 5/1994 | Pinsky et al. . |
| 5,426,306 | 6/1995 | Kolber et al. . |

FOREIGN PATENT DOCUMENTS 2 224 352  10/1989  United Kingdom .

OTHER PUBLICATIONS

J. Reid et al., Applied Physics 17, No. 4, 349–353, (Dec. 1978), "Measurement of the Transition Strength of the 00 °2 9.4 $\mu$m Sequence Band in $CO_2$ Using a Tunable Diode Laser".

K. W. Berndt et al., Rev. Sci. Instrum., vol. 61, No. 7, 1816–1820, (Jul. 1990), "Phase–Modulation Fluorometry Using a Frequency–Doubled Pulsed Laser Diode Light Source".

J. R. Lakowicz, 53–56, 81–85, (1983), "Principles of Fluorescence Spectroscopy".

R. B. Thompson et al., Journal of Biomedical Optics, vol. 1 No. 1, 131–137, (Jan. 1996), "Performance Enhancement of Fluorescence Energy Transfer–Based Biosensors by Site–Directed Mutagenesis of the Transducer".

R. D. Spencer et al., Annals New York Academy of Sciences, 360–376, (1969), "Measurements of Subnanosecond Fluorescence Lifetimes With a Cross–Correlation Phase Fluorometer".

(List continued on next page.)

*Primary Examiner*—K. Hantis
*Attorney, Agent, or Firm*—Alix, Yale & Ristas, LLP

[57] ABSTRACT

A phase fluorometer employs a baseband frequency generator to generate a sample baseband signal at a first frequency $f_o$ and a reference signal correlated to the sample baseband signal. A second signal generator generates a carrier signal having a second frequency f. The sample baseband signal and the carrier signal are combined to form an up-converted sample signal having a frequency $f \pm f_o$. A light source is modulated at the up-converted sample signal frequency $f \pm f_o$ to illuminate a sample. A photo detector detects fluorescence emissions from a sample excited by the excitation light and converts the emission into a fluorescence signal. A down-converter combines the carrier signal and fluorescence signal to form a phase-shifted and down-converted sample signal. A processor digitally processes the phase-shifted and demodulated sample signal and the reference signal to determine the fluorescence lifetime.

36 Claims, 11 Drawing Sheets

OTHER PUBLICATIONS

D. J. S. Birch et al., Rev. Sci. Instrum., vol. 67, 2732–33, 2735, 2737, (Aug. 1996), "Fluorescence Lifetime Sensor of Copper Ions in Water".

J. R. Lakowicz et al., Analytica Chimica Acta, vol. 271, 155–164, (1993), "Optical Sensing of Glucose Using Phase–Modulation Fluorimetry".

R. Holavanahali et al., Journal of Biomedical Optics, vol. 1, 124–130, (Jan. 1996), "Directly Modulated Diode Laser Frequency Doubled in a KTP Waveguide as an Excitation Source for $CO_2$ and $O_2$ Phase Fluorometric Sensors".

A. J. Ozinskas et al., Analytical Biochemistry, vol. 213, 264–270, (1993), "Homogeneous Model Immunoassay of Thyroxine by Phase–Modulation Fluorescence Spectroscopy".

H. Szmacinski et al., Anal. Chem., vol. 65, 1668–1674, (1993), "Optical Measurements of pH Using Fluorescence Lifetimes and Phase–Modulation Fluorometry".

F. Anghel et al., Rev. Sci. Instrum., vol. 66, 2611–2614, (Mar. 1995), "Fluorescent–Based Lifetime Measurement Thermometer for Use at Subroom Temperatures (200–300K)".

C. G. Morgan et al., Rev. Sci. Instrum., vol. 67, 41–47, (Jan. 1996), "A Compact Frequency Domain Fluorometer With a Directly Modulated Deuterium Light Source".

APPARATUS AND METHOD FOR PHASE FLUOROMETRY

This application claims the benefit of U.S. Provisional Application 60/026,495 filed Sep. 19, 1996.

FIELD OF THE INVENTION

This invention relates generally to the field of luminescent spectroscopy and more particularly to Instrumentation and methods used for measurement of fluorescence and phosphorescence lifetimes. Specifically, this invention relates to an improved form of cross-correlation phase fluorometry and phosphorimetry.

BACKGROUND OF THE INVENTION

Certain chemical, biochemical and biological compositions, as well as living systems emit light during exposure to Illumination of certain wavelengths. Luminescent emission of this type includes the phenomena of fluorescence and phosphorescence. Such a composition or system is termed a "sample". The light emitted by the sample decreases gradually after cessation of the exciting illumination in a time scale of picoseconds to seconds. The duration of this luminescent emission after cessation of the stimulating illumination is known as the mean radiative lifetime, defined as the time required for the intensity of the emission to decay to 1/e of its initial value. When the emission arises from fluorescence (emission due to transitions between molecular states of the same multiplicity; e.g., singlet-singlet) the mean radiative lifetime is generally referred to as the fluorescence lifetime; in the case of phosphorescence (multiplicity-forbidden transitions; e.g. triplet-singlet) it is referred to as phosphorescence lifetime. The molecules in the sample responsible for the fluorescence emission are referred to as fluorophores. The discussion herein primarily focuses on the measurement of fluorescence lifetimes; however, as the context will permit, when the terms fluorescence, fluorophore, and fluorometer are used, they should be construed to include the meaning of phosphorescence, phosphor and phosphorimeter, respectively.

Fluorescence emissions from most samples of interest arise from heterogeneous populations of fluorophores which result in a complex emission characterized by a plurality of fluorescence lifetimes. Such emission heterogeneity may arise from the presence of a multiplicity of fluorescing chemical compounds (fluorophores) within the sample. Emission heterogeneity can further arise from a multiplicity of molecular environments for the same fluorophore, or from dynamic processes during the excited state. Such complex fluorescence decays may be mathematically described as a sum of exponential terms, each of which is characterized by an amplitude and a lifetime. It is known in the field that valuable information about the physical, chemical and biological properties of samples can be derived from measurements of the amplitudes and lifetimes of the fluorescence emissions from such samples. Therefore, methods and instruments for fluorescence lifetime measurement are generally designed to be able to resolve the multiple decay components of complex emissions.

A number of methods, which include the so-called time-domain and frequency-domain methods, and corresponding instruments for measuring fluorescence lifetimes are known in the current art. In the time-domain method, the sample is excited with a short pulse of light (short relative to the average lifetime being measured). The fluorescence lifetime behavior of the sample is then determined from analysis of the fluorescence decay that is elicited by the pulsed excitation. Typically, the fluorescence decay is acquired using the known time-correlated single photon counting (TCSPC) technique, although other methods are available. The finite width of the excitation light pulse and the response time of the detection system make it necessary to use a deconvolution procedure to obtain the true fluorescence decay from the experimentally determined decay.

In the frequency-domain method, a sample is excited with light from an intensity-modulated light source. The emitted fluorescence is modulated at the same frequency as the excitation light, but it is demodulated (decreased depth of modulation relative to the excitation light) and lags in phase because of the finite duration of the excited state. Lifetime measurements are made by measuring the frequency response of the sample; i.e., the frequency-dependent phase angle and modulation of the fluorescence emission from the sample. Applying non-linear least squares curve fitting techniques to data obtained from a multifrequency measurement (plot of phase angle vs. modulation frequency or plot of demodulation vs. modulation frequency), analysis of multiple exponential decays may be performed. The multiple exponential decay analysis is based on known theoretical relationships between fluorescence lifetime and phase angle or between fluorescence lifetime and demodulation. See, e.g., Lakowicz "Principles of Fluorescence Spectroscopy", Plenum Press, New York. The measurement of phase or demodulation as a function of frequency (frequency-domain method) is equivalent to determining the time evolution of emission intensity in response to delta pulse excitation (time-domain method). However, in frequency-domain fluorometry deconvolution for the finite width of the excitation pulse and time response of the detection system is unnecessary.

According to heretofore known practice, frequency-domain fluorescence lifetime analysis requires the acquisition of high-resolution phase shift and demodulation values of a sample's emission at numerous excitation frequencies. These excitation frequencies are typically 10–30, over a broad frequency range, e.g., 10–1000 MHZ. A number of instruments and methods have been developed to implement these requirements. Most implementations, and all currently available commercial instruments use the cross-correlation technique, which is well known in the art of frequency-domain fluorometry. The cross-correlation technique is described by Spencer and Weber in an article entitled "Measurement of Sub-nanosecond Fluorescence Lifetime with a Cross-Correlation Phase Fluorometer" in Ann. New York Acad. Sci. (1969), p. 361.

The cross-correlation technique is a means to down-convert the phase and demodulation measurements from the typically high (MHZ) light modulation frequency to a typically low (Hz) frequency to improve signal-to-noise performance and to facilitate analysis of the signal. The typical implementation of the cross-correlation technique is as follows: A frequency synthesizer generates a first frequency, f, which is used to modulate the excitation light. Another frequency synthesizer, driven by the same clock as the first synthesizer, provides a second signal, in linear phase relationship with the first but at a second frequency $f \pm \Delta f$. This second signal is used to modulate the gain of a pair of detectors, one of which detects a portion of the excitation light (reference detector), and the second of which detects the luminescence emitted by the sample (sample detector). Each of the signals at the output of each of the two detectors contains a component which is of a frequency that is the difference between the two frequencies f and f+Δf. This difference, Δf, is termed the "cross-correlation" frequency. The cross-correlation frequency from each detector, typically in the range of 25 Hz to 40 Hz, is filtered and processed by a data acquisition unit. The data acquisition unit provides both the phase shift and the depth of modulation of the luminescence of the sample relative to the excitation light.

According to current practice, frequency-domain fluorometers use two or more synthesizers driven by a single, high-stability, reference oscillator. The single reference oscillator is employed in order to maintain a high degree of frequency stability between the two or more signals which in turn leads to stability of frequency Δf. Depending on the type of synthesizer, this may only guarantee that the ratio of their respective average output frequencies will have the stability of the reference oscillator. Non-idealities, such as noise processes, in each synthesizer are independent and statistically uncorrelated. Therefore, the effects of these non-idealities will be directly reflected in the cross-correlation signal.

A simple accurate algorithm for determination of the phase is to fit the data using a least squares technique to a function of the form A sin (ωt+ϕ). The time, t, and the angular frequency, ω=2πf$_o$, are known. The amplitude, A, and the phase, ϕ, are to be determined. This has the favorable property that the accuracy of the fit improves with the square root of the number of data points. However, the error is distributed between the amplitude and phase values, so that errors in determining amplitude can contaminate the determination of phase.

Commercially available frequency-domain fluorometers are of two basic types: serial instruments and parallel instruments. In the serial type of fluorometer the phase shift and the demodulation of the fluorescence or phosphorescence are sequentially measured at a number of discrete modulation frequencies using the cross-correlation technique. The serial type fluorometer employs about 10 to 30 modulation frequencies logarithmically spaced in a selected frequency interval dependent on the decay characteristics of the fluorophore. These instruments offer high sensitivity but require long data acquisition times of one-half hour to one hour for the collection of 10 to 30 different measurements. Improved apparatus and methods to speed up the data acquisition in this type of instrument have been disclosed recently by Gratton and Barbieri in U.S. Pat. No. 5,212,386 entitled "High Speed Cross-Correlation Frequency-Domain Fluorometry-Phosphorimetry". Several models of serial type frequency-domain fluorometers are commercially available, such as model K2 marketed by ISS (Champaign, Ill.), the SLM 4800 marketed by SLM-Aminco (Urbana, Ill.), and the Fluorolog 3 marketed by JY/Spex (Edison, N.J.).

The above referenced fluorometers employ analog circuits and analog signal processing techniques to process the electrical signals from the reference and sample detectors. This has undesirable effects on the signals due to the bandwidth and phase non-linearity of the analog filters used. Sixth order active bandpass filters are typically utilized in the analog electronics of these commercial frequency-domain fluorometers. These filters are difficult to tune to the appropriate frequency. Furthermore, these filters are susceptible to thermal and drifting problems and exhibit undesirable phase shifts. The accuracy of lifetime determination is limited by the analog signal processing subsystem in these fluorometers.

A parallel type instrument, the SLM model 4850 has been introduced recently by SLM-Aminco. This instrument is based on U.S. Pat. No. 4,937,457 by Mitchell entitled "Picosecond Multi-Harmonic Fourier Fluorometer". This instrument acquires phase and modulation data simultaneously at about one hundred different modulation frequencies. This parallel data acquisition capability can in principle shorten data acquisition time. However, this instrument has very low sensitivity which limits its applicability to strongly fluorescent samples. When the signal is low, as in most cases of practical interest, the only way to achieve reasonable signal-to-noise performance is to increase the data acquisition time. The increase in data acquisition time defeats the main advantage of parallel acquisition capability. Another method and apparatus for parallel frequency acquisition has been disclosed recently by Fedderson et al. in U.S. Pat. No. 5,257,202 entitled "Method and Means for Parallel Frequency Acquisition in Frequency Domain Fluorometry". This method uses a high harmonic content in both the light modulation frequency and in the cross-correlation frequency and an apparatus to separate out all of the harmonic information contained in the cross-correlated signal.

Whether of the serial or parallel type, frequency-domain fluorometers require an intensity modulated light source for excitation of the sample. This may be a broadband light source, such as a high-pressure Xenon lamp, or may be a CW laser, such as an Argon ion laser. Either of these light sources is externally modulated with an electro-optic or an acousto-optic device. Pockel cells are often employed for this purpose. In recent years, the preferred light source for frequency-domain fluorometry has become a pulsed mode-locked Argon ion laser, or a synchronously-pumped and cavity-dumped dye laser. The main advantage of these light sources for frequency-domain fluorometry is that the pulsed light output is intrinsically modulated at all integer harmonics of the pulse repetition rate, up to several gigahertz. Furthermore, all the harmonics within the bandwidth of the system are of comparable amplitude because of the very high bandwidth of the excitation function (pulse widths of tens of picoseconds).

However, these mode-locked laser systems are extremely expensive, large, and consume considerable power. Recently, a cross-correlation serial fluorometry method and apparatus was disclosed by Berndt et al in U.S. Pat. No. 5,196,709 entitled "Fluorometry Method and Apparatus Using a Semiconductor Laser Diode as a Light Source". The apparatus utilizes a picosecond pulsed laser diode. This pulsed laser diode is a less expensive light source of high harmonic frequency content and is also small in size and has lower power requirements. This apparatus uses three phase-locked frequency synthesizers. The first synthesizer generates a first frequency, f, to trigger a train of light pulses from the picosecond light pulser. The fluorescence emission excited by these light pulses is detected by a photo multiplier tube (PMT), the output of which contains the high harmonic content of the emitted fluorescence. A second frequency synthesizer, phase locked to the laser pulser generates a second frequency at a harmonic, Nf, of the first frequency f. A third frequency synthesizer phase-locked to the first synthesizer generates a third frequency, Nf+Δf. The second and third signals are coherently mixed in an RF mixer to generate the reference cross-correlation signal at Δf. The output of the PMT, with its high harmonic content, is coherently mixed with the third frequency, Nf+Δf, in a second RF mixer to generate the sample cross-correlation signal corresponding to the Nf harmonic of the emitted fluorescence. The outputs of the two mixers are then fed into a phase meter to measure the phase angle corresponding to frequency Nf. By sequentially varying the integer value of N, a plurality of harmonics contained in the fluorescence emission (output of the PMT) are sequentially cross-correlated to generate the phase angle vs. frequency data. Despite the lower cost of the picosecond pulsed laser diodes relative to mode-locked synchronously pumped cavity dumped dye lasers, picosecond pulsed laser diodes are still relatively expensive.

According to the current practice of frequency-domain fluorometry, the capability for multifrequency operation is considered essential because fluorescence lifetime analysis has been practiced primarily by scientists who require a detailed description of the lifetime behavior of the fluorophores in the sample. However, as the field of fluorescence lifetime analysis has matured, there is an emerging and growing trend towards the application of fluorescence lifetime measurement to sensor applications, as opposed to its use as a basic research tool in chemical, biochemical and biophysical research. Fluorescence lifetime-based sensing is generally based on a sensor which transduces the binding of an analyte to a sensing matrix, or a change in a physical variable such as temperature, into a change in the average fluorescence lifetime of a population of fluorophores complexed into the sensing matrix. Although the fluorescence decay from such a sensor may arise from a heterogeneous population of fluorophores and therefore consist of more than one exponential component, a suitable metric that correlates with analyte concentration or the analytical variable of interest can be obtained from a single average lifetime measurement.

The recent literature discloses a number of examples of such fluorescence lifetime-based sensing schemes in which quantification of an analyte is based on a phase angle measurement at a single modulation frequency. For example, fluorescence resonance energy transfer-based assays have been described for measurement of metal ions (Thompson et al. J. Biomed. Optics vol. 1 pp131–137, 1996; Birch et al. Rev. Sci. Instrum. vol. 67 pp2732–2737, 1996), for the measurement of glucose (Lakowicz & Maliwai, Anal. Chim. Acta, vol. 271, pp.155–164, 1993), for the measurement of $CO_2$ (Holavanahali et al, J. Biomed. Optics vol.1 pp124–130, 1996), for the measurement of thyroxine (Ozinskas et al. Anal. Biochem. vol. 213 pp264–270, 1993). Fluorescence lifetime-based pH sensing methods (Szmacinski & Lakowicz, Anal. Chem. vol. 65 pp 1668–1674, 1993) and temperature sensing methods (Iliescu et al. Rev. Sci. Instrum. Vol. 66, pp2611–2614, 1995) have also been described.

Despite the fact that a lifetime measurement at a single modulation frequency is all that is required for most sensor applications, all of the commercial frequency-domain fluorometers, patents or articles described above relate to multifrequency phase fluorometer instruments. While in principle, a multifrequency fluorometer could be operated at a single frequency to perform a sensing function, all such systems are prohibitively expensive and impractical for sensor applications. The systems that utilize synchronously pumped cavity dumped dye lasers or even picosecond pulsed laser diodes may be even more expensive. In addition all these multifrequency instruments are complex, relatively large and delicate, and require considerable electrical power for operation. For example, required electrical power is on the order of 1 kilowatt for systems with Xenon-lamps, and as high as tens of kilowatts for some laser-based systems. Time resolved systems suffer from similar drawbacks. In contrast, sensors for lifetime-based sensing fluorometers may only require low-cost, small, rugged, low-power-usage, reliable, easy-to-operate lifetime detectors of high sensitivity, resolution, accuracy and precision, with real-time or near real-time measurement capability. In addition they must be suitable for deployment in harsh environments and, in many applications, also require portability, a fiber-optic sample interface, and the capability to operate from battery power for extended periods of time.

Some examples of lifetime sensor applications and related requirements would include in vivo clinical diagnostics. Small size and low power requirements are specially important, as bedside space is limited and must be shared with other apparatus. Further sensor applications include in situ environmental monitoring where a low-weight, portable, battery operated instrument is needed. Real-time, on-line industrial process analysis where a rugged, compact, low-cost package with a fiber-optic sample interface and rapid data acquisition capability is required is an additional sensor application. Furthermore, space based applications, where power usage, size and weight are of paramount concern, and oceanographic sensors for long-term deployment at a mooring, are also considered possible applications.

Thus, there is a need for an improved fluorescence lifetime measurement apparatus and method which provides high accuracy, sensitivity and lifetime resolution, with shorter measurement time, lower power requirements, a smaller more rugged package, and without the high cost and complexity of prior art systems.

It is an object of the present invention to overcome the shortcomings and limitations of the above described prior art related to lifetime sensing.

SUMMARY OF THE INVENTION

In brief, a cross-correlation, frequency-domain fluorometer in accordance with the invention is operable to measure simultaneously the phase and modulation response of a fluorescent sample at a single frequency of excitation, or sequentially at a number of frequencies of excitation.

In accordance with the present invention, a low-frequency baseband signal, $f_o$, is generated explicitly. Then by employment of a frequency up-converter, the baseband signal is up-converted and employed to modulate a light source to interrogate a sample at a high frequency appropriate for the fluorescence lifetimes of interest. Subsequent to interaction of the modulated excitation light of the light source with the sample, the fluoresence emission received from the sample is converted to an electrical fluoresence signal and down-converted back to the baseband frequency for acquisition and analysis. The up-conversion process translates the spectrum of the baseband signal to the spectral region directly above (or alternatively, below) a high-frequency carrier signal. In the process of down-conversion the signal spectrum is translated back down to the baseband frequency. The phase and depth of modulation information acquired by the up-converted signal through interaction with the sample and propagation through the instrument is preserved in the down-converted baseband signal.

This method differs from the cross-correlation method of the prior art. According to current practice the cross-correlation signal is generated implicitly as the difference in frequency of two high-frequency sources which differ in frequency by a small amount. For example, one frequency is at 100 MHZ and a second frequency is at 100.00002 MHZ. The conventional approach requires extraction of a small difference between two large numbers and therefore places stringent requirements on the stability of the output frequency and phase of the frequency synthesizers, thereby requiring expensive synthesizers. In order to maintain a high degree of frequency stability of the two high-frequency signals, each of the synthesizers is driven by a single, high-stability, reference oscillator. However, depending on the type of synthesizer, the conventional method may only guarantee that the ratio of the respective average output frequencies will have the stability of the reference oscillator. Non-idealities, such as noise processes, in each synthesizer are independent and statistically uncorrelated. Therefore, the effects of these non-idealities will be directly reflected in the cross-correlation signal. In contrast, in the single sideband method of the present invention, the low-frequency signal is generated directly. The direct generation of the low-frequency signal obviates the need for two phase locked highly stable high-frequency signal generators. Thus, this invention can be implemented with less expensive off-the-shelf electronic components.

The low-frequency baseband signal is generated by a first signal generator. The output of the baseband signal generator is split into two baseband signals—the "reference" baseband signal and the "sample" baseband signal. The reference baseband signal provides the reference for the phase determination of the sample baseband signal. The sample baseband signal is used to generate the modulated excitation light which probes the sample in order to acquire the phase and amplitude information corresponding to the fluorescence emitted by any fluorophores in the sample. However, the low frequency $f_o$ of the sample baseband signal is inadequate to generate a significant phase shift and relative demodulation in the emitted fluorescence from most fluorophores of practical interest. Fluorophores typically have average lifetimes in the range of tens of picoseconds to tens of nanoseconds. In the present invention, therefore, the $f_o$ sample baseband signal is up-converted in a frequency up-converter to a frequency $f+f_o$ or $f-f_o$ by combining the sample baseband signal with a carrier signal having a frequency f. The carrier signal, f, is generated by a second frequency generator. The value of f is chosen to produce a significant phase shift in the emitted fluorescence due to the finite luminescent lifetimes of the emitting fluorophores in the sample, for example 100 MHz.

The up-converted sample signal at frequency $f\pm f_o$ is used to modulate a light source. The optical fluorescence emission at the up-converted frequency $f\pm f_o$ results from the interaction of the modulated excitation light with the sample. The fluoresence emission contains the phase and depth of modulation information of analytical interest. The fluoresence emission is converted by a photo detector to an electrical fluoresence signal of frequency $f\pm f_o$. The electrical fluoresence signal of the photo detector is then mixed with the carrier signal in an RF mixer and then low pass filtered. The signal is down-converted to the baseband frequency in order to recover the phase shifted demodulated sample signal at the frequency $f_o$. The phase shifted and demodulated sample signal contains the phase and amplitude of analytical interest. The phase shifted and demodulated sample signal acquires a fixed time delay due to optical and electronic propagation through the instrument and contains the phase and amplitude information from the sample. In contrast, the reference signal, acquires only a fixed time delay due to electronic propagation through the instrument. The fixed instrument-related delays are calibrated out by using a non-fluorescing scattering sample (zero lifetime calibrating sample), or a reference sample of known fluorescence lifetime. The down-converted phase shifted and demodulated sample signal, and the reference baseband signals are captured digitally by an analog-to-digital (A-to-D) converter and stored for processing. The processing is accomplished by software with suitable algorithms as described below for the determination of the phase and the relative depth of modulation.

A phase fluorometer in accordance with the present invention can be small, rugged, reduced-cost, and operate with reduced power consumption. This invention therefore is preferably implemented with inexpensive, low-power-usage light sources, such as laser diodes, light-emitting diodes (LED), or any other type of inexpensive light-emitting structure which can be modulated at a frequency suitable to measure the lifetimes of interest. Laser diode or LED light sources have the additional advantage of not requiring an external modulator such as an acousto-optic modulator, or a Kerr cell or a Pockels cell, which therefore eliminates the size, weight and cost of these units as well as the power required to drive them. Further advantages of laser diodes and LEDs suitable for the present invention are their low power consumption, which at the low end can be of the order of 100 mW. Further advantages of laser diodes and LEDs include their small size and their rugged mechanical characteristics.

Further reduction in cost, size, weight and power usage can be achieved by directly generating the baseband reference signal. This obviates the need for a reference photo detector. In the conventional cross-correlation method, a reference photo multiplier tube is modulated at the heterodyne frequency to generate the reference cross correlation signal. Modulation of a photo multiplier tube (PMT) detector is performed by applying an alternating voltage to one of the dynodes which typically requires several watts of power. Eliminating the need for a modulated reference detector in the present invention reduces power usage and eliminates the cost, size and weight of one detector with its associated support electronics, high-voltage power supply, RF amplifier and ancillary hardware.

One embodiment of the present invention provides a phase fluorometer of high sensitivity, high accuracy and precision, high resolution of the order of a few picoseconds, and rapid measurement time, of the order of one second or less. These performance parameters are interrelated. Utilizing a baseband frequency of the order of 1 KHz, as opposed to the conventional cross-correlation frequencies of 25–40 Hz, significantly shortens the amount of time required to acquire sufficient data points for an accurate and precise phase determination with the digital algorithm used in the present invention. A further advantage of the relatively high baseband frequency employed in the present invention is avoidance of 1/f noise contributions to the measurement.

Another embodiment of the present invention comprises a method and an apparatus wherein the light source is modulated with the carrier signal. The modulated excitation light illuminates a sample. The emission from the sample generates an electrical signal. The electrical signal is combined with an up-converted signal comprising the sample baseband signal and the carrier signal. The combined signal forms a down-converted signal at the baseband frequency. The down-converted signal contains the phase and modulation information introduced by the sample. The fluorescence lifetime of the sample may then be calculated by processing the phase-shifted and demodulated baseband signal and the reference signal which is correlated to the baseband sample signal.

A still further embodiment of the present invention comprises a method and an apparatus for phase fluorometry operable over a broad range of optical wavelengths from the ultraviolet to the near infrared, while preserving high resolution, sensitivity, low cost, small size and weight of the apparatus.

In summary, overcoming the shortcomings of the prior art for lifetime sensor applications; i.e. providing methods and apparatus for lifetime sensing that are reduced-cost, reduced-power-usage, small, rugged, accurate, sensitive, and capable of rapid measurement with picosecond resolution, is preferably accomplished by features which can include: (1) generating amplitude modulated excitation light from a sinusoidally modulated less expensive, low-power-usage, laser diode or light-emitting diode, (2) eliminating the reference channel optical detector and associated electronics, (3) generating a low-frequency baseband reference signal, $f_o$, directly, rather than by generating the difference frequency between two high-frequency signals f and f+Δf in an RF mixer or a photo multiplier tube, (4) using a relatively high baseband frequency of about 1 KHz compared to the conventional cross-correlation frequency of 25–40 Hz, (5) combining the baseband signal, $f_o$, with a high-frequency carrier signal, f, using a method to up-convert the low frequency $f_o$ to a high frequency f+$f_o$ or f−$f_o$, (6) modulating the light source at f, f+$f_o$ or f−$f_o$ (7) down-converting the electrical fluoresence signal back to the baseband frequency $f_o$ prior to signal acquisition for analysis, (8) performing this down-conversion by mixing the output of the electrical fluoresence signal from the photo detector with the carrier signal externally in an RF mixer, as opposed to modulating the gain of the detector at the down-converting frequency, (9) digitally acquiring the phase shifted and demodulated sample signal after minimal filtering with a low-pass filter, and digitally acquiring the directly generated reference baseband signal, (10) determining the phase and demodulation values with a software algorithm operating on the digitally acquired waveforms, as opposed to employing analog signal processing techniques.

Other objects, features and advantages of the present invention will become more readily apparent from the detailed description of the preferred embodiments and the related drawings presented below.

DESCRIPTION OF PREFERRED EMBODIMENTS OF THE INVENTION

Figure 1:
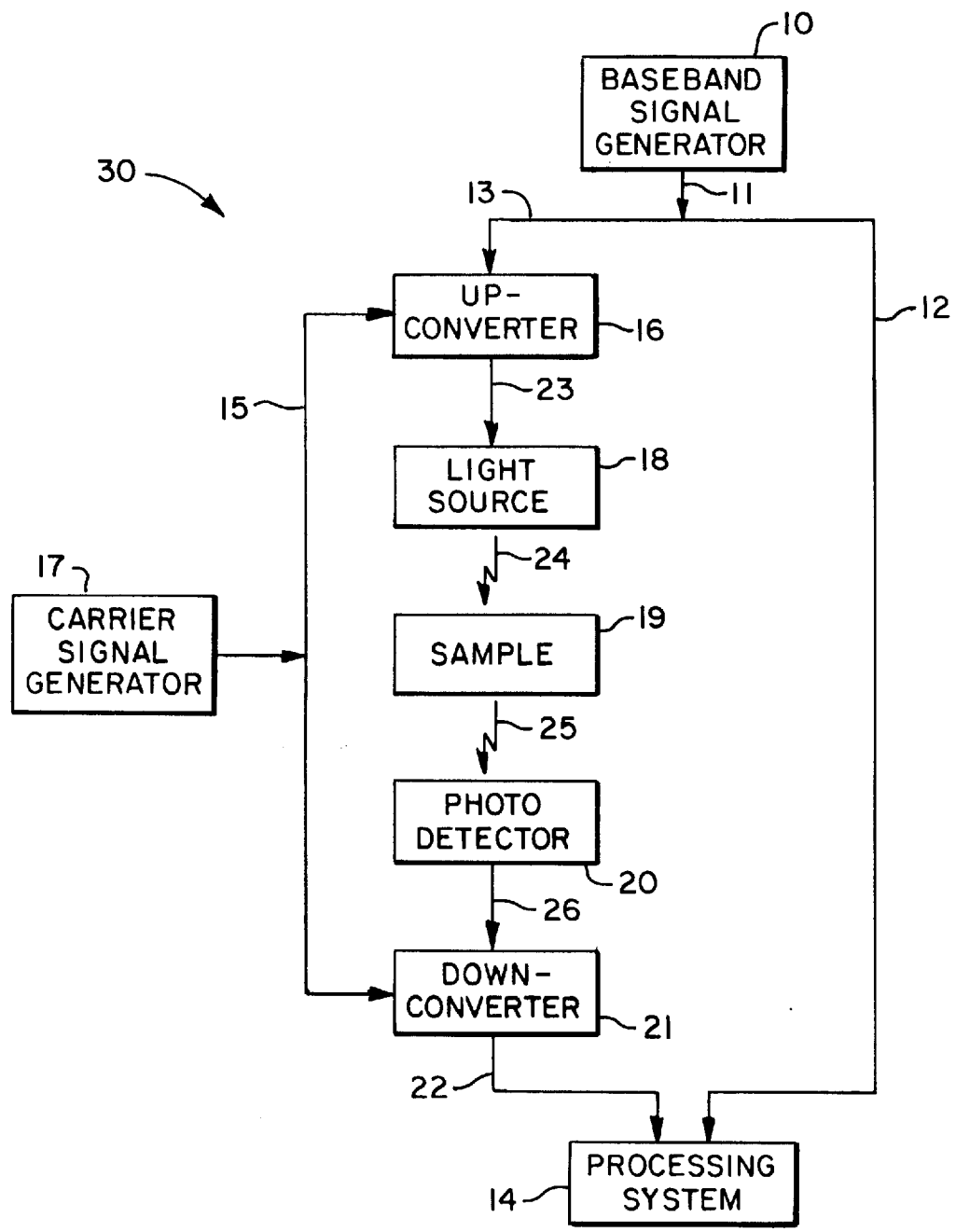
FIG. 1. is a block diagram illustrating the operation of a phase fluorometer in accordance with the present invention.

The principle of operation of one embodiment of a phase fluorometer 30 in accordance with the invention is illustrated in the block diagram of FIG. 1. A baseband signal generator 10 generates a baseband signal 11 at a frequency $f_o$. This baseband signal is split into a reference baseband signal 12 and a sample baseband signal 13. The reference baseband signal 12 provides the reference input to a phase determining apparatus 14. A carrier signal 15 having a frequency f is generated by a carrier signal generator 17. The sample baseband signal 13 is converted in an up-converter 16 to an up-converted sample signal 23 having a frequency f+$f_o$ or f−$f_o$. The up-converted sample signal 23 is obtained by combining the sample baseband signal 13 with a carrier signal 15 of a frequency f by a single sideband technique. Baseband frequency $f_o$ is preferably greater than 10 Hz and carrier frequency f is preferably greater than 1 MHz.

The up-converted sample signal 23 is used to directly modulate a light source 18, which may be a laser diode, an LED or another light emitting device. The light source 18 is modulatable at the frequency f±$f_o$ of the up-converted sample signal 23 to emit a modulated excitation light 24. The modulated excitation light 24 is used to illuminate the sample 19, wherein fluorophores in the sample 19 are excited by the modulated excitation light 24 to form a fluorescence emission 25. The fluorescence emission 25 acquires a phase change and a change in depth of modulation corresponding to a frequency-dependent weighted average of the lifetimes of the various emitting fluorophores. The fluorescence emission 25, modulated at f±$f_o$, is detected with a photo detector 20 which converts the optical fluorescence emission 25 to an electrical fluorescence signal 26. The electrical fluorescence signal 26 is then down-converted to the baseband frequency $f_o$ by mixing it with the carrier signal in a down-converter 21. The down-converter 21 preferably has an RF mixer and low-pass filter. The down-converter 21 generates a phase-shifted and demodulated sample signal 22. The phase-shifted and demodulated sample signal 22 functions as the sample input into the phase determining apparatus 14 which determines the phase and the depth of modulation relative to the calibrating signal.

In most applications the baseband signal 11 will be a single sinusoid in the audio to sub audio range, but the baseband signal 11 need not be limited to this range of frequencies or even to a single sinusoid. A preferred baseband frequency range is from 10 Hz to 20 KHz. The baseband signal 11 may be a complex deterministic signal or even band-limited noise. The frequency of the carrier signal 15 may be varied sequentially by any number of known methods to perform phase and demodulation measurements at a number of discrete frequencies in order to analyze complex multi-component decays.

Figure 2:
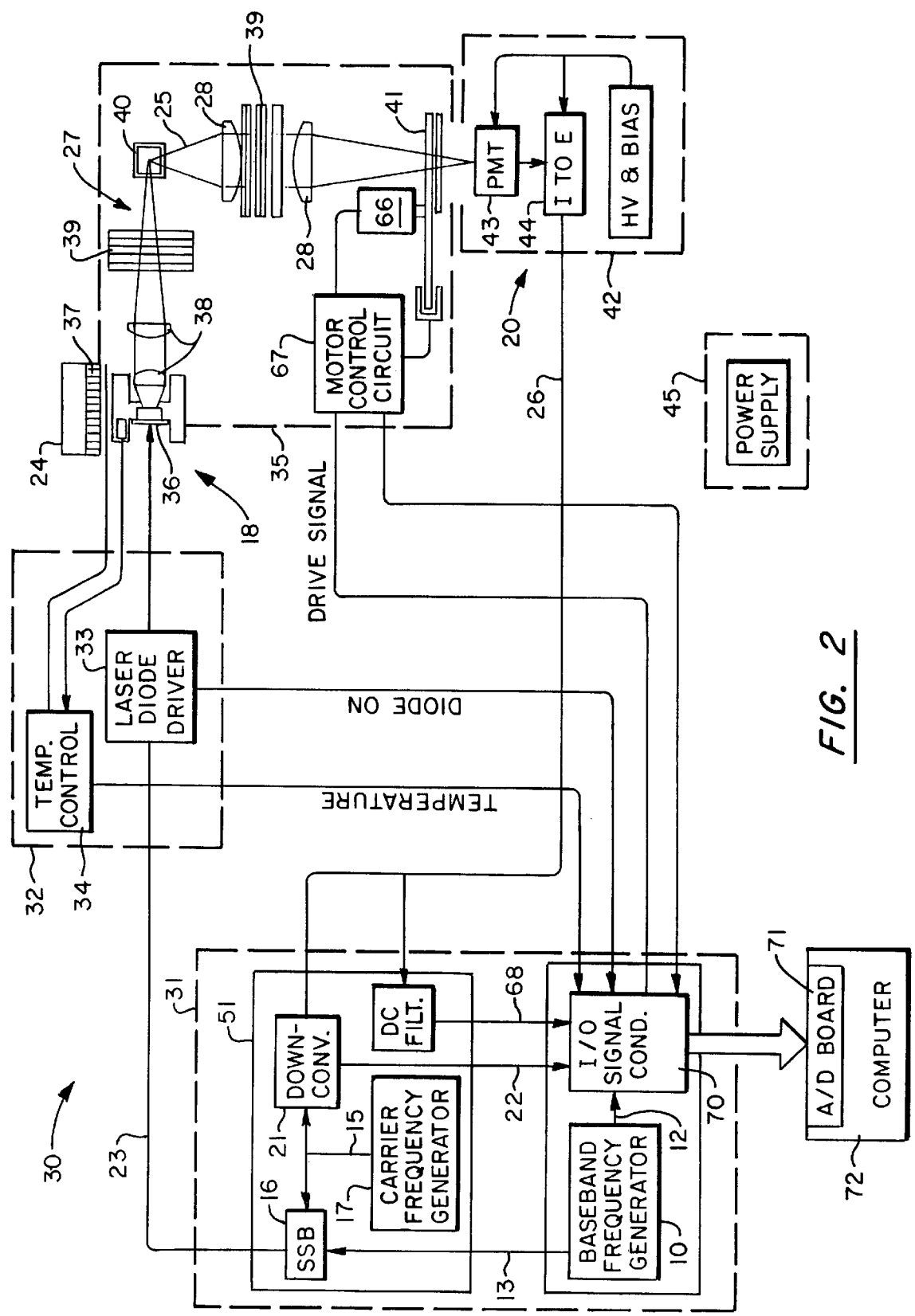
FIG. 2 is a block diagram of a single-frequency laser-diode phase fluorometer according to the present invention.

An example of a single-frequency laser-diode phase fluorometer 30 in accordance with the present invention is shown in FIG. 2. The phase fluorometer 30 comprises four subsystems. A signal subsystem 31 performs frequency generation, up-conversion, down-conversion and signal conditioning. A laser subsystem 32 has a laser diode driver 33 and laser temperature control electronics 34. A sample subsystem 35 contains a sample compartment 27 which includes the laser diode 36, light-focusing optical components 38, a sample holder 40, optical filters 39, and a motor-controlled variable neutral density filter 41. A detector subsystem 42 contains a photo multiplier tube (PMT) detector 43, a current-to-voltage converter 44, and a high-voltage power supply 45 for the PMT 43. The power supply 45 is a standard line supply, but in an alternative embodiment it may be replaced by a battery.

Figure 3:
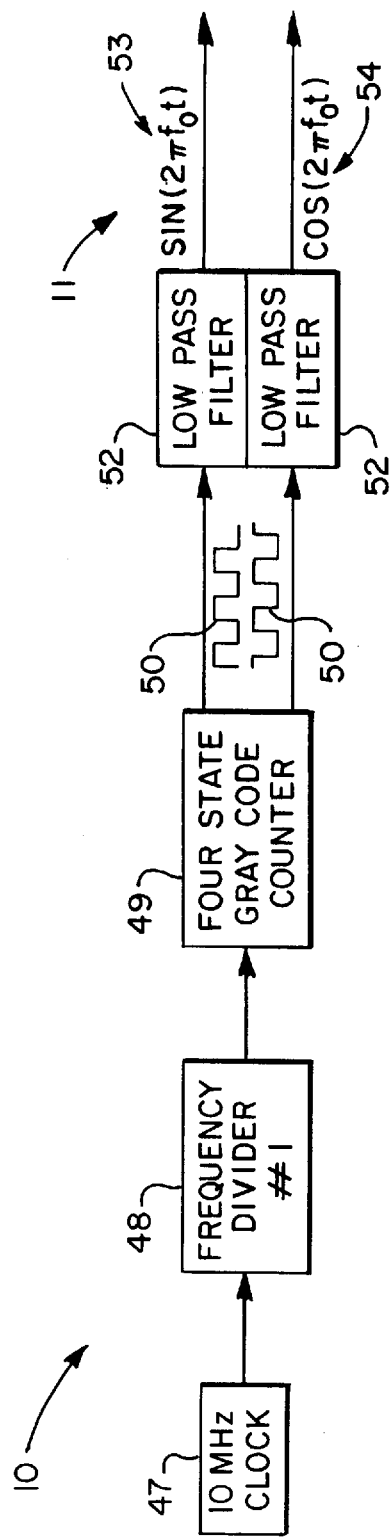
FIG. 3. is a block diagram illustrating the principle of the single frequency baseband generation of FIG. 2.

In the embodiment of the phase fluorometer 30 shown in FIG. 2, the baseband frequency $f_o$ is nominally 610 Hz and the carrier frequency is 70 MHz. The baseband frequency is generated by the baseband signal generator 10. The operation of the baseband signal generator 10 is illustrated in FIG. 3. Referring to FIG. 3, the output of a crystal controlled 10 MHz reference oscillator 47 is divided by 4096 ($2^{12}$) in a frequency divider 48 and then input into a synchronous state machine four-state Gray code counter 49. The output of the four-state Gray code counter is an unfiltered baseband signal 50 of two square waves in quadrature of frequency equal to ¼ of the state machine clock frequency; i.e., 610.35 Hz. In principle, this method of generating the baseband frequency reduces the phase noise of the 10 MHz reference oscillator by the square root of 4096×4; i.e. by a factor of 128. The unfiltered baseband signal 50 of two square waves is filtered by low-pass filters 52 to remove all the frequency components except the fundamental frequency, and to provide the baseband signal 11 with two sinusoidal outputs, e.g., a quadrature baseband signal 54 and an in-phase baseband signal 53 at the baseband frequency.

Referring to FIG. 2, the 70 MHz carrier frequency is generated by carrier signal generator 17 which has a crystal controlled oscillator with suitable amplification. In an alternative embodiment for multifrequency operation, the carrier signal generator 17 could be a frequency synthesizer with quadrature outputs. Up-conversion of the baseband signal 11 is performed by the up-converter 16 having a single sideband frequency synthesizer employing a single sideband technique whereby the baseband signal 11 and the carrier signal 15 are combined as described below and illustrated in FIG. 4. A preferred range for the carrier frequency is 10 MHz to 300 MHz.

Figure 4:
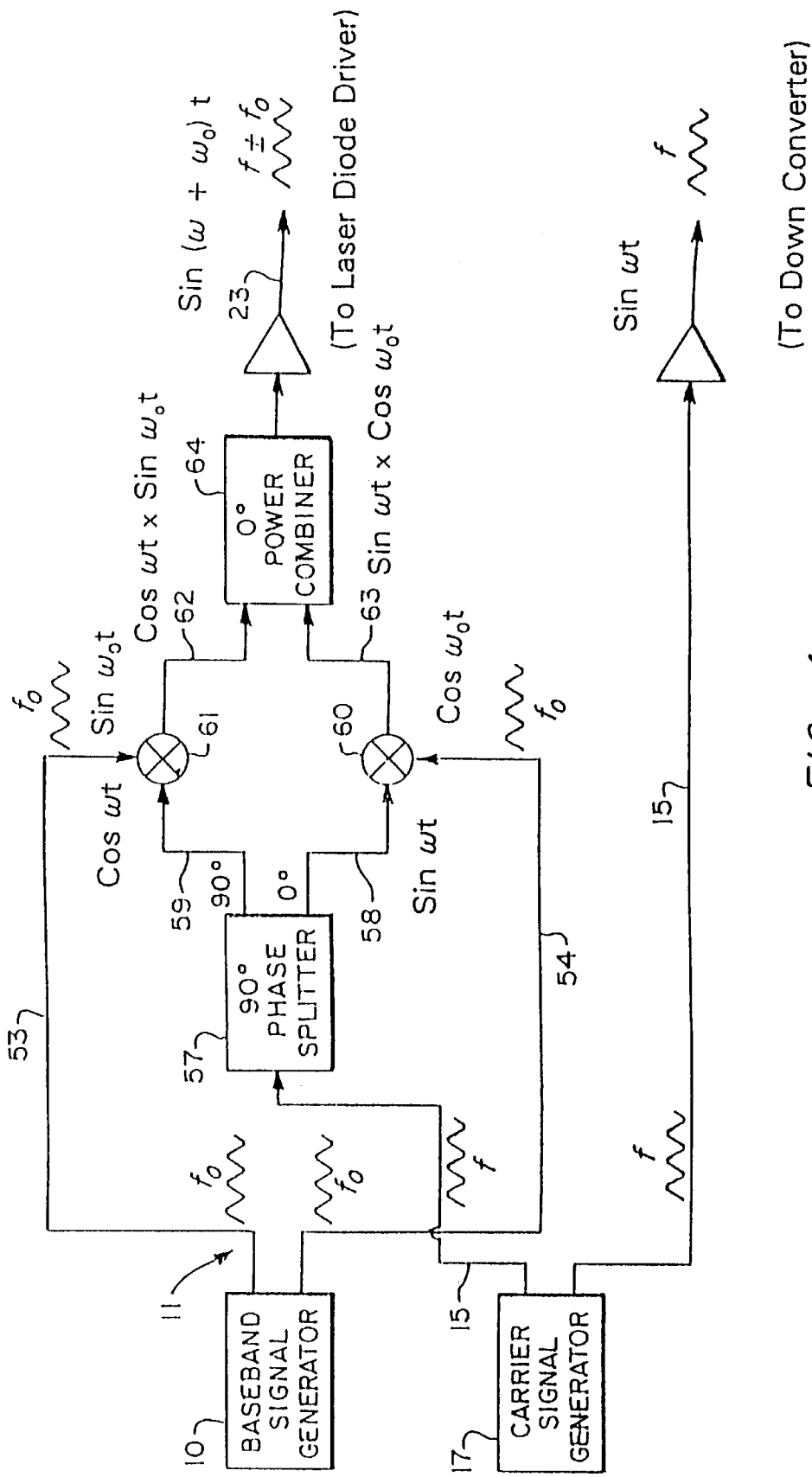
FIG. 4 is a block diagram illustrating the operation of the single sideband frequency synthesizer of FIG. 3.

The single sideband technique is a method of generating a sinusoidal signal whose frequency is the sum of the frequencies of two other sinusoidal signals. This technique is a direct synthesis method and delivers superior electrical and cost performance compared with direct digital synthesis or phase-locked loop synthesis. Operation of the single sideband frequency synthesizer is illustrated in FIG. 4. The carrier signal 15 is put through a 90° phase splitter 57, creating an in-phase carrier signal 58 and a quadrature carrier signal 59 at the preferred 70 MHZ carrier frequency. The in-phase carrier signal 58 is mixed with the quadrature baseband signal 54 in a mixer 60, and the quadrature carrier signal 59 is mixed with the in-phase baseband signal 53 in a mixer 61. The resulting first mixed signal 62 and second mixed signal 63 are combined in a power combiner 64 to produce the up-converted sample signal 23 at a frequency of 70.000610 MHZ. Not shown in FIG. 4 are supporting components such as amplifiers, impedance matching components, etc. The phase splitter 57, power combiner 64, and two mixers 60, 61 are commercially available in an integrated package from several marketers, including Mini-Circuits and MA/Com. Although the embodiment of the fluorometer of FIG. 2 employs a single sideband technique to generate the up-converted sample signal 23, the invention may be implemented with any other suitable frequency up-converting apparatus.

Alternatively, the carrier signal may comprise an in-phase carrier signal 58 and a quadrature carrier signal 59. The in-phase carrier signal 58 may be mixed with the in-phase baseband signal 53 in a mixer 60 and the quadrature carrier signal 59 may be mixed with the quadrature baseband signal 54 in mixer 61.

Referring back to FIG. 2, the up-converted sample signal is employed to modulate the light source 18. The light source 18 has a laser diode driver 33 and a laser diode 36. The up-converted sample signal 23, at 70.000610 MHZ, provides the input to the laser diode driver 33 whose output is used to intensity modulate the laser diode 36. Two laser diodes have been used in two examples of the present embodiment: a 5 mW 670 nm Panasonic LN9R05 and a 5 mW 650 nm Toshiba TOLD9421 S. The laser diode 36 is temperature-controlled by a thermoelectric cooler 37. LEDs, such as a Nichia Model No. NSPB500 (blue) LED, a Nichia Model No. NSPG500 (green) LED and a Sharp Model No. GL5UR3K (red) LED, have also been used in other embodiments. The sample compartment 27 contains optical filters 39, as well as light focusing optical components 28 to focus the modulated excitation light 24 on the sample holder 40 such as a sample cuvette. Additional optical components 28 focus the fluorescence emission 25 onto the cathode of the photo multiplier tube (PMT) detector 43. Any number of relatively inexpensive commercially available PMTs such as Hamamatsu model R928 or Hamamatsu model HR5600-1 may be used in the present invention.

The motor controlled variable neutral density filter 41 is used to maintain a computer-programmable constant light input into the PMT 43. The angular position of the circular variable neutral density filter 41 is controlled by motor 66 driven by motor controller 67 through a feedback loop from the output of the PMT 43. In an alternative embodiment of the invention, the motor controlled variable neutral density filter 41 may be replaced by a variable aperture stop. The output of the PMT 43 is put through the current-to-voltage converter 44 to form the electrical fluorescence signal 26. The electrical fluorescence signal 26 is down-converted to the phase-shifted and demodulated sample signal 22 at baseband frequency in a down-converter 21 having a mixer and a low pass filter. The electrical fluorescence signal 26 is passed through a low pass filter 51 to form a DC signal 68. The reference baseband signal 12, the phase-shifted and demodulated sample signal 22, and the DC signal 68 of the PMT output are conditioned by a signal conditioner 70 and input into a commercial A-to-D converter 71. The A-to-D converter 71 digitizes the waveforms of the signals 12, 22 and 26. Embodiments constructed in accordance with the invention have used either a Data Translation DT2831 or a Computer Boards CIO-DAS1600 multi function I/O board.

The present invention preferably utilizes a method to compute the phase of the phase-shifted and demodulated sample signal 22 based on a zero-crossing algorithm for noisy data and incorporates least-squares representations near zero crossing points. Downward zero crossings are detected for each cycle of the reference baseband signal 12 and phase-shifted and demodulated sample signal 22. In the vicinity of each zero crossing a least squares linear fit is performed using approximately 20% of the number of points per cycle. The zero crossing of the least-squares line is used as the local zero crossing. Corresponding zero crossings for the reference baseband signal 12 and phase-shifted and demodulated sample signal 22 are subtracted to find the local zero-crossings difference. This procedure is repeated for each corresponding pair of the downward zero crossings recorded. The computed local zero-crossings differences are averaged for the data set and the standard deviation is computed. The local zero-crossings differences are reviewed to eliminate any that fall outside two standard deviations of the mean value. The remaining local zero-crossings differences are averaged and used as the computed zero-crossings difference.

Although the baseband signal frequency and the A-to-D data acquisition frequencies are known, they can drift relative to each other. Thus the period of the baseband frequency (reference and phase-shifted and demodulated sample signals 12, 22), as measured by the A-to-D converter, is not exact. To convert zero-crossing difference to phase difference, the period of the signals 12, 22 must be measured. The average period of the signal is computed by taking the difference between the first and last zero crossings on the sample channel divided by the number of cycles between them. This removes relative drift of the A-to-D clock relative to the baseband signal generator clock.

The accuracy of the phase determination with this method improves with the square root of the total number of data points used in the analysis. In addition, the phase determination is insensitive to the accuracy in determining the amplitude; thus, noise affecting amplitude determination does not affect phase determination.

To measure the phase fluorescence lifetime of a sample, first a calibrating sample such as a non-fluorescent sample (zero-lifetime sample) is placed in the sample compartment to generate a calibrating signal (calibrating phase value) as described above. Then, the fluorescent sample is placed in the sample compartment and the sample signal (sample phase value) is generated in the same manner. The phase fluorescence lifetime, $\tau_p$, is then calculated according to $\tau_p = \tan\phi/\omega$, where $\phi$ is the difference between the calibrating and sample phase values, and $\omega$ is the angular modulation frequency, e.g., $2\pi(f+f_o)$. The modulation lifetime can be obtained from the relative depth of modulation, m, between the calibrating and sample signals according to $m=[1+\omega^2\tau_m^2]^{-\frac{1}{2}}$. Alternatively, instead of a non-fluorescent sample, a fluorescent sample of known fluorescence lifetime may be used as a calibrating sample.

The digitized waveforms from the A-to-D converter 71 are stored and analyzed with a computer 72 for determination of phase and relative depth of modulation as previously described. For accurate determination of fluorescence lifetime, the data is over sampled to reduce noise. This over sampling is in two forms: number of cycles and points per cycle. Typically, 60 to 750 cycles with 40 to 750 points per cycle have been used for a single phase determination. A digital filtering algorithm may be used to remove harmonics and broadband noise from the raw data.

Figure 5:
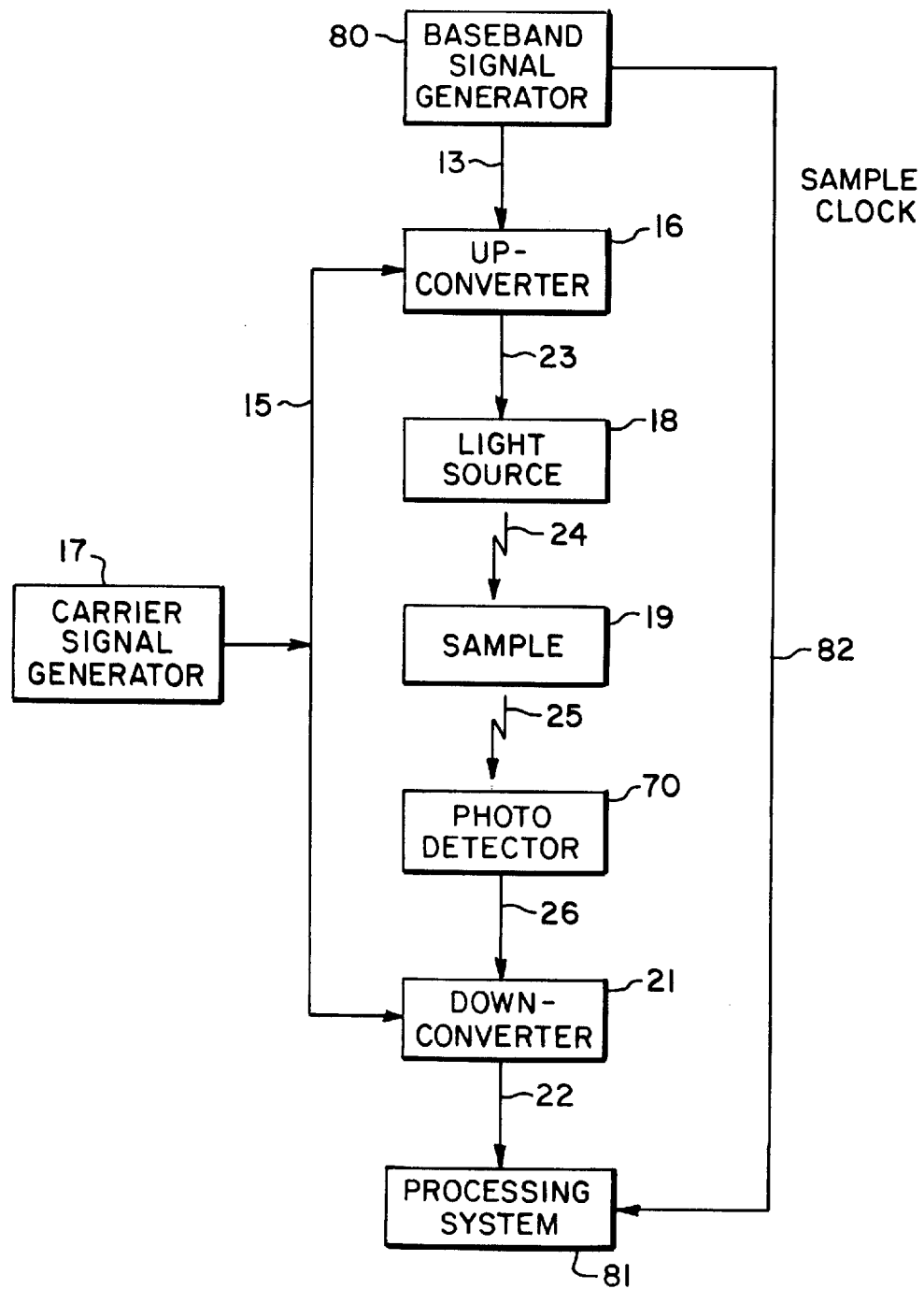
FIG. 5 is a block diagram illustrating the operation of an alternate embodiment of the phase fluorometer in accordance with the present invention, the fluorometer having a synchronous sampling system.

The principle of operation of another embodiment is a synchronous sampling phase fluorometer 79 in accordance with the present invention illustrated in FIG. 5. The principle of operation of the synchronous sampling phase fluorometer 79 differs from the phase fluorometer 30 illustrated in FIG. 1 in that a synchronous sampling baseband signal generator 80 is synchronized with a data acquisition system 81. In this case, phase determination must be performed digitally. Hence, the down-converted phase-shifted and demodulated sample signal 22 is sent to a data acquisition system 81. The synchronous sampling baseband signal generator 80 provides a reference clock signal 82 for the data acquisition system 81. This reference clock signal 82 is synchronized to the sample baseband signal 13 as will be described in detail below. Due to the manner of this synchronization, an explicit reference baseband signal 12 is no longer required.

This embodiment of a synchronous sampling baseband frequency generator 80 provides a reference clock signal 82 whose frequency is related to that of the sample baseband signal 13 by the ratio of two integers. This embodiment also provides a reference clock signal 82 having a sample clock pulse train whose first pulse has a specific, reproducible and precise phase relationship with the zero crossing of the most recent cycle of the sample baseband signal 13. The fluorometer 79 further provides a number of sample pulses to the data acquisition system corresponding to an integral number of half cycles of the sample baseband signal 13. Two possible implementations of the synchronous sampling baseband signal generator 80 of the fluorometer 79 are described below.

Figure 6:
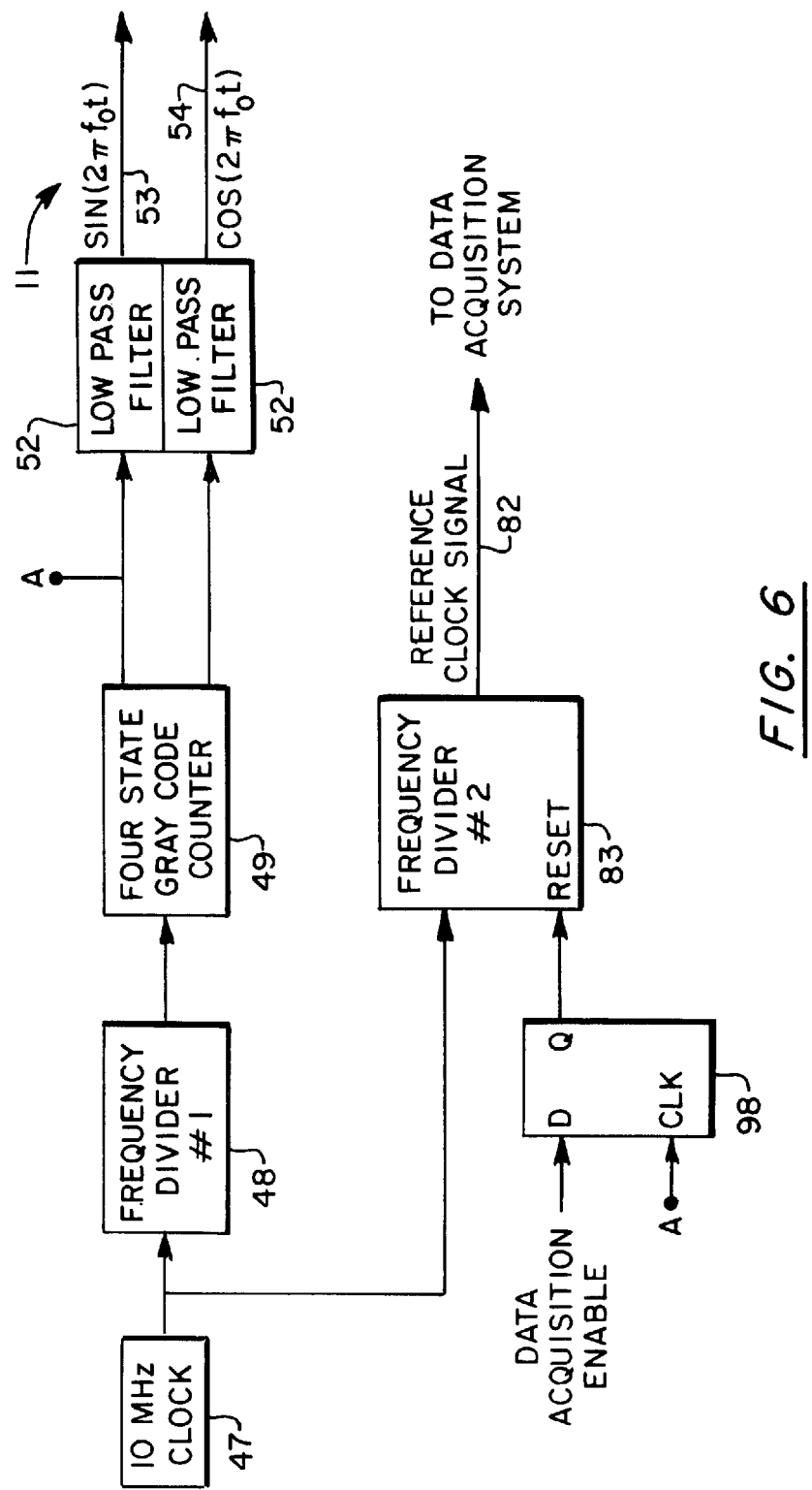
FIG. 6. is a block diagram illustrating an example of a single-frequency baseband signal generator with synchronous sampling of the phase fluorometer of FIG. 5.
Figure 7:
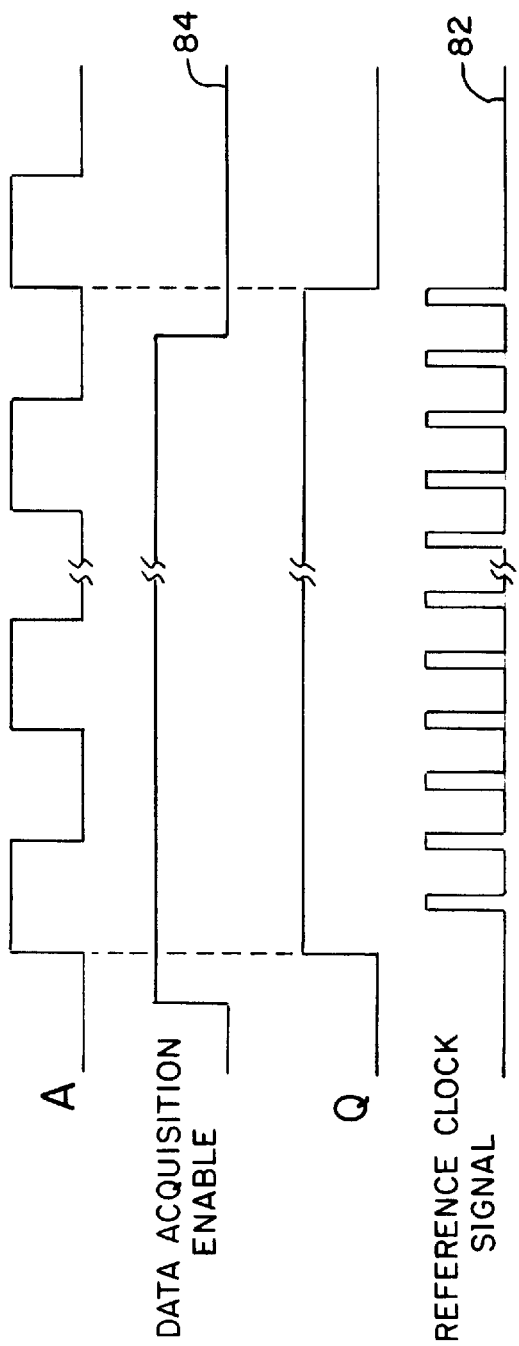
FIG. 7. is a timing diagram illustrating the operation of the single-frequency baseband signal generator with synchronous sampling shown in FIG. 6.

FIG. 6 shows a first implementation of the synchronous sampling baseband signal generator 80. The synchronous sampling baseband signal generator 80 has the 10 MHZ clock 47, frequency divider #1 48, four-state Gray code counter 49 and lowpass filters 52 previously described and shown in FIG. 3. The synchronous sampling baseband frequency generator 80 further employs a D type flip-flop 98 and a second frequency divider 83. Operation of the system is illustrated in the timing diagram of FIG. 7. Signal A is one of the pair of square waves in quadrature of the unfiltered baseband signal 50. At some arbitrary time, an externally provided data acquisition enable signal 84 goes active. On the next active edge of signal A, the Data Acquisition Enable signal 84 is clocked through the flip-flop 98 which appears as signal Q. This allows the second frequency divider 83 to come out of reset and start counting. As a consequence of this synchronization of the data acquisition enable signal 84, the first sample pulse has a specific, reproducible and precise phase relationship with the most recent active edge of one wave A of the unfiltered baseband signal 50 and therefore with the most recent zero crossing of the sample baseband signal 13. This forms an implicit reference for phase determination. When sufficient data has been collected, the data acquisition enable signal 84 goes inactive. This is clocked through the flip-flop 98 and again synchronized with one wave A of the unfiltered baseband signal 50, thereby guaranteeing that an integral number of cycles of the sample baseband signal 13 have been collected.

A significant advantage of this method is that while the frequency of the 10 MHZ clock 47 may drift slightly with time, the ratio of the frequency of the reference clock signal 82 to the frequency of the unfiltered baseband signal 50 is known precisely. Therefore the "digital" frequency of the digitized sample baseband signal 13 is also known with high precision. This allows the calculation of a single frequency Discrete Fourier Transform (DFT) on the collected data to estimate its phase and amplitude. This calculation is more accurate if the size of the data set corresponds to an integral number of half cycles of the analysis frequency, hence the above requirement. If greater precision is required, the information from the DFT may then be used as the starting point for other iterative methods. The ratio of the frequency of the reference clock signal 82 to the frequency of the sample baseband signal 13 should not be chosen to be an integer; i.e., the two should not be harmonically related. If they are harmonically related, then the quantization noise of the digitization process becomes highly correlated with, and indistinguishable from, the sample baseband signal 13.

Figure 8:
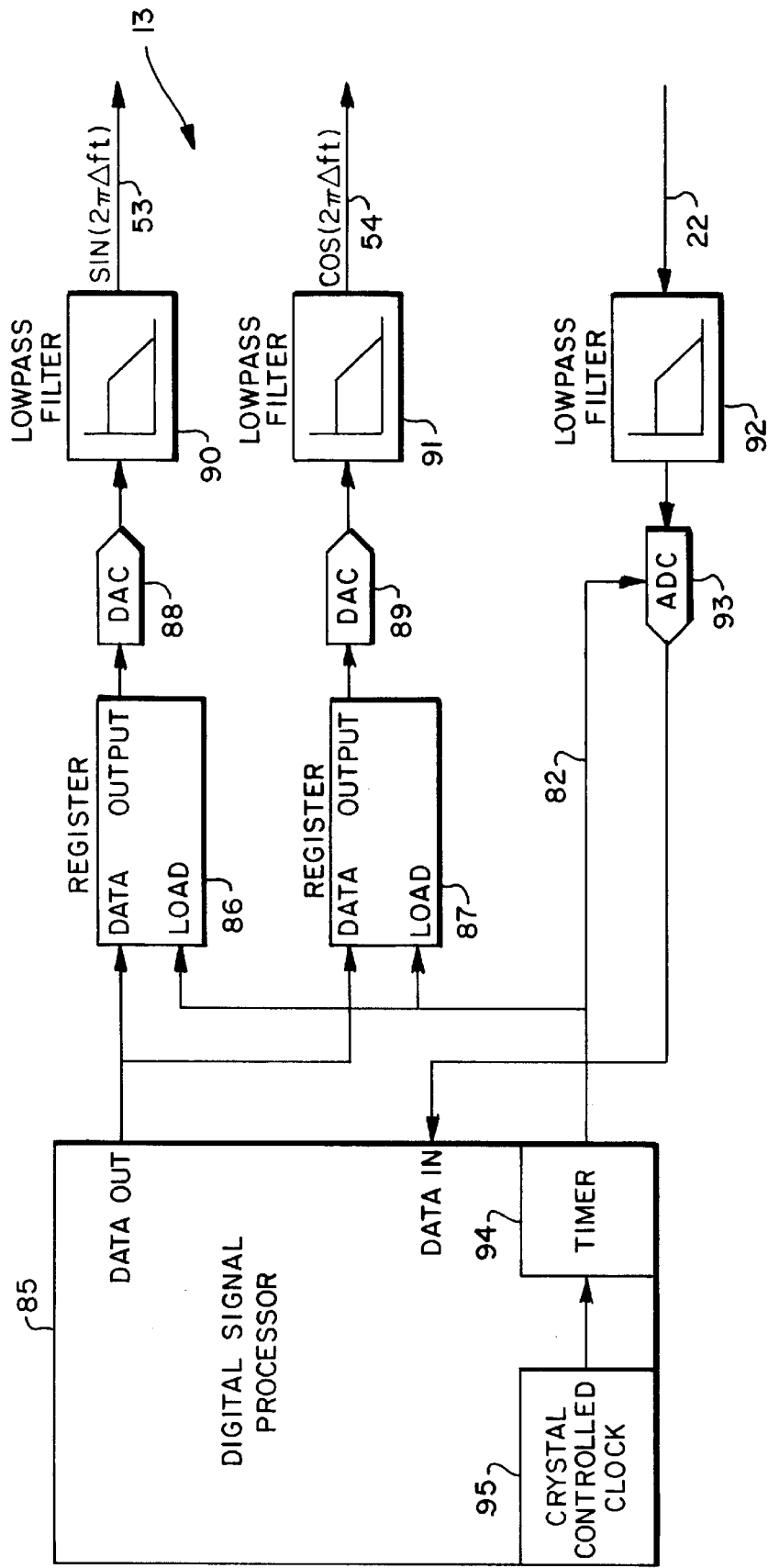
FIG. 8. is a block diagram illustrating a digital signal processing implementation of baseband signal generation with synchronous sampling of FIG. 5.

A second possible implementation of the synchronous sampling baseband signal generator 80' is shown in FIG. 8. This is a digital signal processing approach. During data collection, a digital signal processor (DSP) 85 alternately outputs samples of a sine wave and a cosine wave. As each pair of samples are output sequentially, they are resynchronized in the pair of registers 86, 87 by the reference clock signal 82. The samples then go to their respective digital to analog converters (DACs) 88, 89. The output of the DACs 88, 89 then goes through low-pass filters 90, 91 to remove the sampling frequency and its harmonics. The result is the quadrature pair of sinusoids 53, 54 at the baseband frequency and forming the sample baseband signal 13 as in the previous implementations.

The phase-shifted and demodulated baseband signal 22 is first band limited by a low-pass filter 92 to prevent aliasing and then is digitized by an analog-to-digital converter (ADC) 93. After each pair of sine and cosine samples have been output and synchronized, the ADC 93 is read. The reference clock signal 82 is shown as being generated by an on-board timer 94 of the DSP 85, but the reference clock signal 82 may also be generated externally. All the advantages of the implementations cited above are fully realized in the synchronous sampling baseband signal generator 80' due to the fact that the generation of the sample baseband signal 13 is synchronized with the data acquisition process, and the reference clock signal 82 is generated by downcounting a high-frequency crystal-controlled oscillator.

The DSP 85 may be implemented in numerous ways. Almost any source of computing power that is fast enough for the highest baseband frequency desired can be used. This includes personal computers, laptops, etc. The computing power may also be embedded in the fluorometer 79. Dedicated digital signal processor integrated circuits are commercially available from a number of semiconductor manufacturers such as Motorola, Texas Instruments, Analog Devices, Harris, etc.

A further advantage of this implementation, is that the samples of sine and cosine used to generate the baseband signals are the same as needed for calculation of the Discrete Fourier Transformation (DFT). Generating these samples and multiplying them by the corresponding input samples constitutes a substantial part of the work of calculating a DFT. Therefore, it may be possible, depending on the speed of the DSP 85, to accomplish a significant portion of the DFT calculation during data acquisition. A further advantage of this implementation is that the baseband frequency is under software control and therefore programmable. The range of baseband frequencies is determined by the speed of the DSP 85.

The performance of an example of the asynchronous sampling embodiment of the phase fluorometer 30 illustrated in FIGS. 1–4 was evaluated utilizing an optical delay line to simulate very short fluorescence lifetimes. In these tests the phase of the sample baseband signal 13 was measured for an arbitrary setting of the optical delay line to provide a reference phase measurement. The setting of the optical delay was then incremented by a small amount and the phase of the sample baseband signal 13 was determined relative to the reference phase value. Analysis of these and other data have shown that the phase angle accuracy of the system is routinely better than 0.05° with a measurement time of less than one second. At 70 MHz modulation frequency, this corresponds to less than 2 picoseconds time delay resolution.

Figure 9:
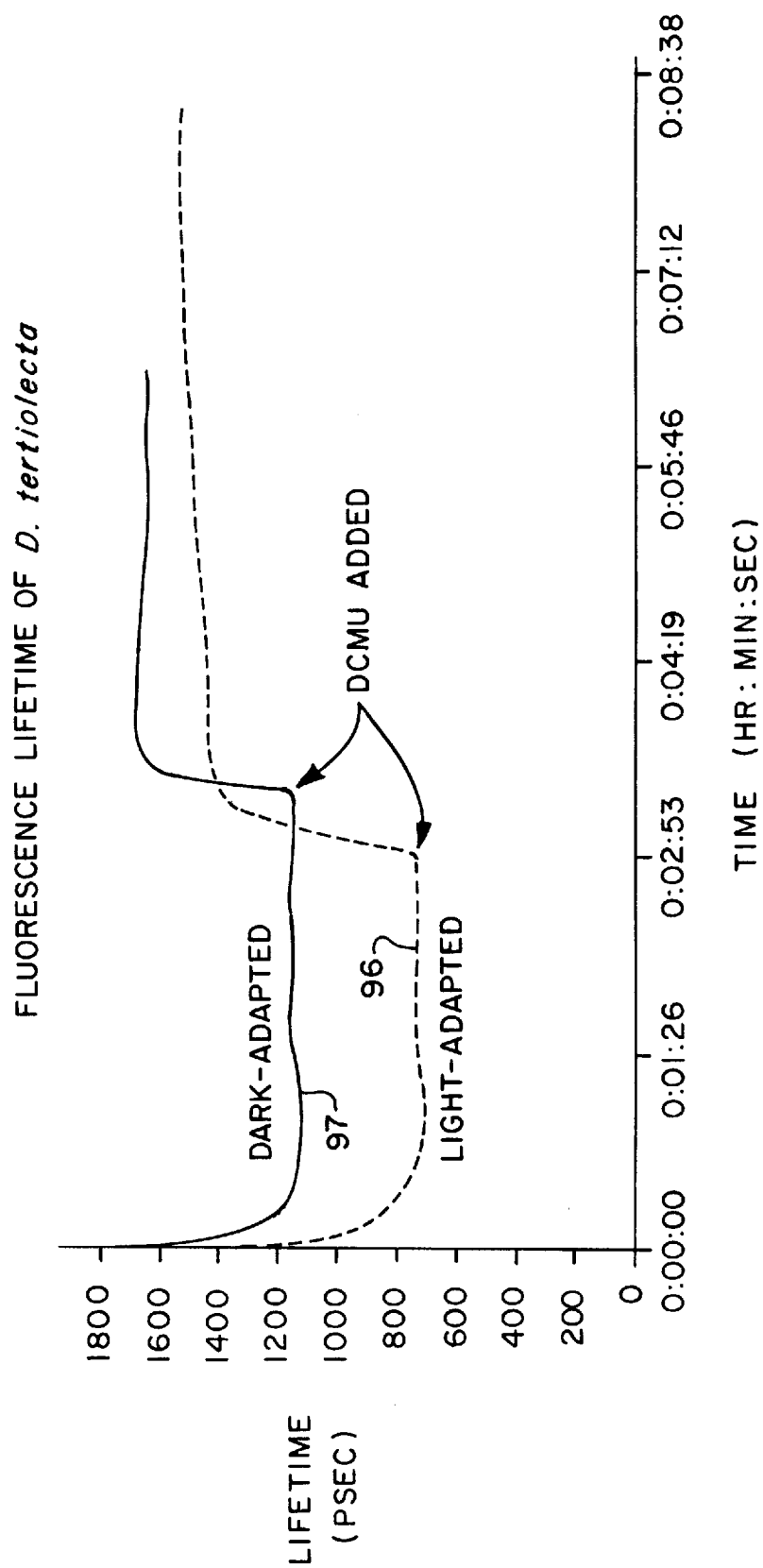
FIG. 9 shows representative kinetics of chlorophyll fluorescence from suspensions of the alga *Dunaliella teffiolecta* measured with the present invention.

An example of real-time fluorescence lifetime measurements from a biological sample, obtained with the phase fluorometer 30 of FIGS. 1–4, is illustrated in FIG. 9. FIG. 9 shows the fluorescence lifetime of chlorophyll fluorescence excited at 670 nm from two separate samples consisting of suspensions of light- 96 and dark- 97 adapted *Dunaliella tertiolecta* microalgae. In vivo chlorophyll fluorescence from plants and microalgae is a sensitive indicator of photosynthetic function. In particular, the quantum yield, and hence the lifetime of chlorophyll fluorescence is inversely related to photo synthetic efficiency (photochemical electron transfer). Referring to FIG. 9 the data demonstrates that the frequency-weighted average fluorescence lifetimes from both samples undergo an initial decrease attributed to a known chlorophyll induction phenomenon and thereafter achieve steady state values. Addition of DCMU, a potent inhibitor of electron transfer in photo system II causes a rapid increase in chlorophyll fluorescence lifetime due to the resulting increase in fluorescence quantum yield. These data illustrate the capability of the invention for monitoring the efficiency of a complex multi-component fluorescence process by single-frequency phase fluorometry.

Other embodiments of the present invention besides those described above can be readily implemented. For example, instead of a PMT 43, the photo detector 20 can be a photodiode, an avalanche photodiode or a multichannel plate photo multiplier tube. The light source 18 may be a laser diode operating at longer wavelengths in the infrared spectral range, or at shorter wavelengths in the visible spectral range. Alternatively, LEDs may be used for the light source 18. Less expensive near-infrared, red, blue, and green LEDs whose intensity output can be modulated up to approximately 100 MHz are currently commercially available. Other alternative light sources 18 which preserve the advantages of reduced-cost, reduced-power, small size and reduced weight include certain broadband gas discharge lamps. A deuterium light source, for example, is rich in short-wavelength ultraviolet light. Unlike other broadband light sources, a deuterium light source does not require an external optical modulator such as a Kerr cell or a Pockels cell or an acousto-optic modulator. A deuterium light source can be directly modulated up to approximately 120 MHz. (See, e.g., Morgan et al. "A Compact Frequency-Domain Fluorometer with a Directly Modulated Deuterium Light Source" in Review of Scientific Instruments, vol. 67, p.41.) With the use of laser diodes, LEDs or other light sources, such as a deuterium lamp, embodiments of the present invention can be implemented to provide less expensive, reduced-power operation over a broad range of wavelengths ranging from about 250 nm in the ultraviolet to over 1000 nm in the infrared.

The present invention can provide a reduced-cost, rugged, small, single-frequency phase fluorometer for sensing applications where the concentration of an analyte or the magnitude of the analytical variable of interest can be determined from a phase angle measurement performed at a single modulation frequency. Nevertheless, the invention can further provide a reduced-cost, rugged, small, serial multifrequency fluorometer for those applications where adequate analysis requires the measurement of phase angle at multiple frequencies. An alternative embodiment, therefore, sequentially generates a number of carrier signals 15 of discrete carrier frequencies to enable measurement of phase angle at multiple modulation frequencies.

Another alternative embodiment of the present invention provides vertically polarized excitation of the sample and includes a polarizer in front of the photo detector 20 to enable measurement of the phase angle between the parallel and perpendicular components of the fluorescence emission 25 when the sample is excited by sinusoidally modulated vertically polarized light. To measure the differential phase between the polarized components of the fluorescence the photo detector polarizer is first rotated to render it parallel to the polarization of the modulated excitation light and a phase angle measurement is performed. Then, the photo detector polarizer is rotated to render it perpendicular to the polarization of the modulated excitation light and another phase angle measurement is performed. The phase difference between the two signals obtained by this method can be related through known theoretical relationships to an average rotational rate and average degree of orientational constraint of the fluorophores in the sample.

A further embodiment of the present invention comprises a method and an apparatus suitable for fluorescence lifetime-based sensing of samples by fiber-optic or other optical systems, including conventional microscopy, confocal and near field microscopy. The samples may include chemical compositions, in vivo or in vitro plant and animal biological tissues, cells or fluids, as well as bacteria, viruses and other microorganisms. Further samples include industrial process streams and effluents and environmental samples in situ or in vitro, such as ground water, coastal and ocean waters, soils, minerals, gases, vapors and aerosols. Analytical samples can be included such as effluents from chromatography, electrophoresis and flow cytometry processes. Additional samples are biosensors for diverse analyses and other types of optodes, as well as sensors for physical variables such as, for example, temperature, pressure, electrical potential difference, solvent polarity, solvent viscosity, molecular rotational motion, intra or intermolecular distances, and molecular diffusion rates.

Figure 10:
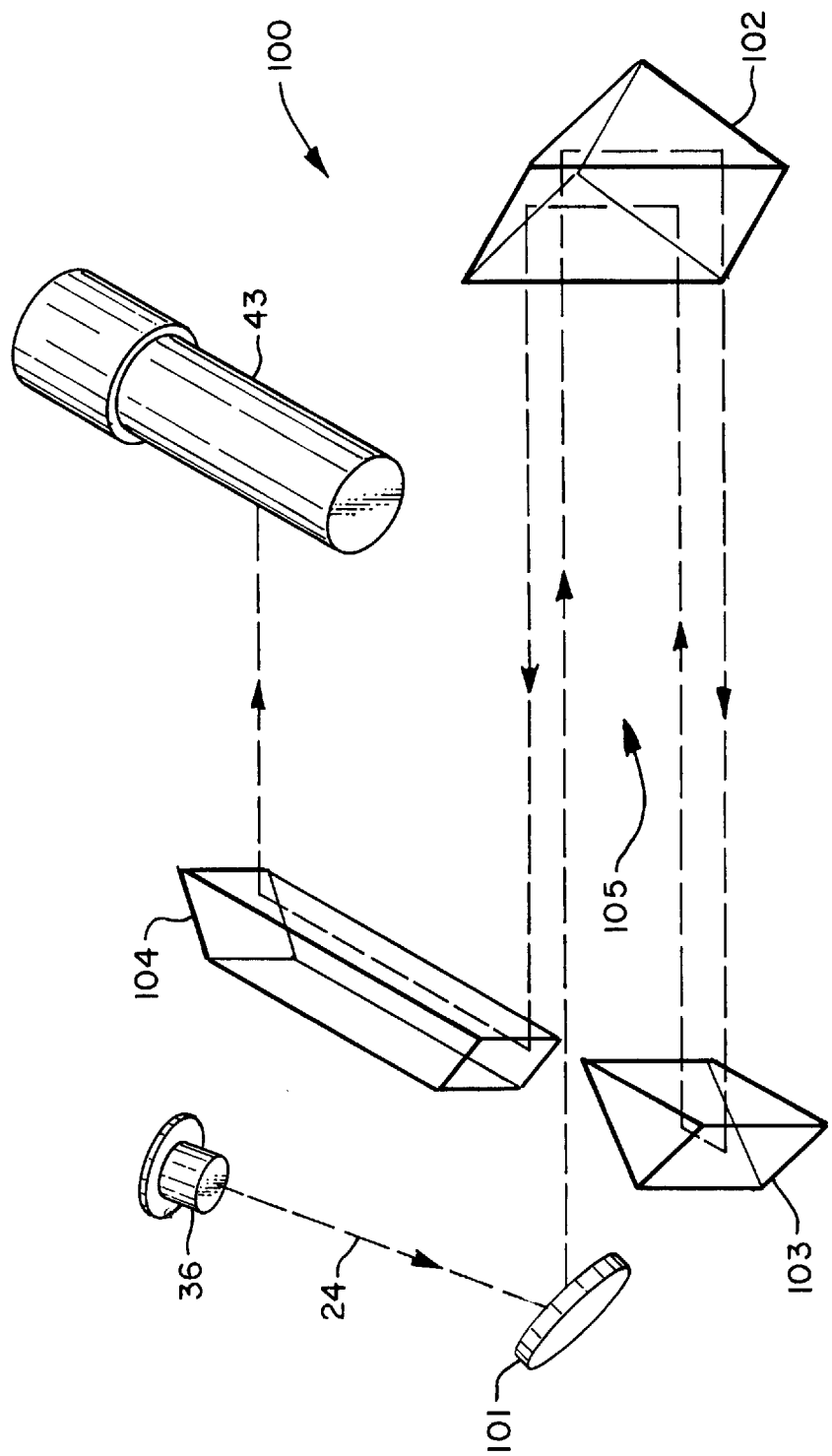
FIG. 10 shows an optical delay line that has been used in one embodiment of the present invention.

Additional embodiments of the invention relate to applications outside the field of frequency-domain or phase fluorometry. In an embodiment in accordance with the invention, the sample compartment and associated optics of the phase fluorometer 30 of FIG. 2 are replaced by a variable optical delay line 100. Such an optical delay line 100 is shown in FIG. 10. The modulated light 24 from the laser diode 36 is directed by a beam steering mirror 101 onto a folded light path 105. The folded light path 105 is created by a moveable corner reflector 102, a first fixed prism 103 and a second fixed prism 104. In this arrangement, a change in distance Ax between the corner reflector 102 and the first fixed prism 103 causes an increase in the optical path length of 4Δx. This optical delay line 100 would be able to resolve a minimum Δx displacement of 150 $\mu$m for the 70 MHz phase fluorometer 30 described above with a resolution of 2 ps. The optical delay line 100 in accordance with the present invention is useful for teaching applications, materials characterization, and other applications. For example, an embodiment of the phase fluorometer 30 of FIG. 2, with the optical delay line 100, has been used for a direct time-of-flight measurement of the speed of light. This embodiment has been further employed for measurement of the index of refraction and birefringence of materials, and for teaching basic aspects of wave motion.

Figure 11:
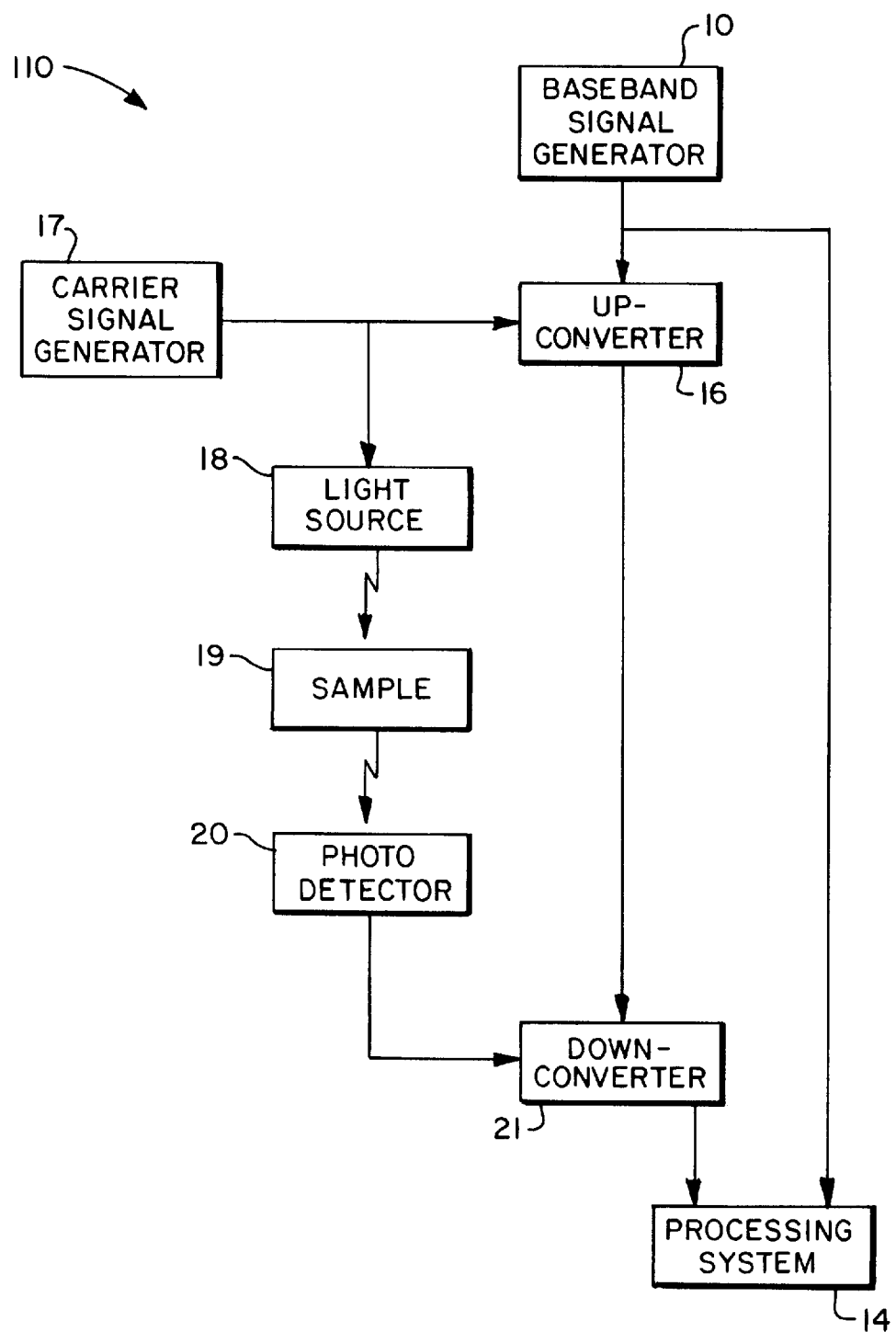
FIG. 11 is a block diagram illustrating the operation of another embodiment of a phase fluorometer in accordance with the invention.

The principle of operation of another embodiment of a phase fluorometer 110 according to the present invention is shown in FIG. 11. A baseband signal generator 10 generates a baseband signal at a frequency $f_o$. This baseband signal is split into a reference baseband signal and a second baseband signal. The reference baseband signal provides a reference input to a phase determining apparatus 14. A carrier signal having frequency f is generated by a carrier frequency signal generator 17. The second baseband signal is converted in an up-converter 16 to an up-converted signal having frequency $f \pm f_o$. The up-converted signal is obtained by combining the second baseband signal with a carrier signal of frequency f by a single sideband technique. Baseband frequency $f_o$ is preferably greater than 10 Hz and carrier frequency f is greater than 1 MHz.

The carrier signal is also used to directly modulate a modulatable light source 18 at the carrier frequency. This modulated light is then used to probe a sample 19 as previously described. Light emitted by the sample is detected by a photo detector 20 which converts the emitted modulated light to a modulated electrical signal. This sample signal is down-converted to the baseband frequency $f_o$ by combining it with the carrier frequency signal in a down-converter 21. The down-converter 21 is preferably comprised of an RF mixer and low-pass filter. As previously described, the baseband sample signal retains the phase and modulation information acquired during probing of the sample. The baseband sample signal and the reference baseband signal are presented to the phase determining apparatus 14 as previously described.

Preferred embodiments of the invention have been described above, but it is understood that additional changes and modifications may be made without departing from the essential elements of the invention.

What is claimed is:

1. A method of measuring the phase of a sample signal relative to a reference signal comprising:

(a) generating a sample baseband signal having a first predetermined frequency $f_o$ which is greater than 10 Hz;

(b) generating a reference signal correlated to said sample baseband signal;

(c) generating a carrier signal having a second predetermined frequency f which is greater than 1 MHz;

(d) combining said carrier signal f and said sample baseband signal $f_o$ to form an up-converted sample signal having a frequency $f \pm f_o$ equal to the sum or difference of said first and second frequencies;

(e) modulating a light source with said up-converted sample signal to form modulated excitation light;

(f) illuminating a sample with said modulated excitation light;

(g) detecting an emission from said sample;

(h) generating an electrical signal indicative of said emission;

(i) combining said electrical signal and said carrier signal to form a down-converted signal at the baseband frequency which contains the phase and modulation information introduced by the sample; and (j) processing said down-converted signal and said reference signal.

2. The method of claim 1 wherein said reference signal and said sample baseband signal have the same frequency.

3. The method of claim 1 wherein the sample baseband signal is a sinusoid.

4. The method of claim 3 wherein said reference signal has a frequency equal to the frequency of said sample baseband signal.

5. The method of claim 1 wherein said sample baseband signal comprises an in-phase baseband signal and a quadrature baseband signal, and wherein step (d) further comprises phase splitting said carrier signal to create an in-phase carrier signal and a quadrature carrier signal, mixing said in-phase carrier signal and one of said quadrature baseband signal and said in-phase baseband signal to form a first mixed signal, mixing said quadrature carrier signal and the other of said quadrature baseband signal and said in-phase baseband signal to form a second mixed signal, and combining said first and second mixed signals to form said up-converted sample signal.

6. The method of claim 1 wherein said sample baseband signal comprises an in-phase baseband signal and a quadrature baseband signal, wherein said carrier signal comprises an in-phase carrier signal and a quadrature carrier signal and wherein step (d) further comprises mixing said in-phase carrier signal and one of said quadrature baseband signal and said in-phase baseband signal to form a first mixed signal, mixing said quadrature carrier signal and the other of said quadrature baseband signal and said in-phase baseband signal to form a second mixed signal, and combining said first and second mixed signals to form said up-converted sample signal.

7. The method of claim 1 wherein said first frequency $f_o$ is in the audio to sub-audio range.

8. The method of claim 1 wherein said first frequency $f_o$ is in the range of 10 Hz to 20 KHz.

9. The method of claim 8 wherein said second frequency f is in the range of 10 MHz to 300 MHz.

10. The method of claim 1 wherein said reference signal is a reference clock signal.

11. The method of claim 10 wherein the ratio of the frequency of said reference clock signal to the frequency of said sample baseband signal is a ratio two integers.

12. The method of claim 1 wherein step (j) further comprises the steps:
  detecting zero-crossings for each cycle of said reference signal and said down-converted signal;
  performing a least squares linear fit of each said zero-crossing to determine said local zero-crossings; and
  subtracting corresponding local zero-crossings for said reference signals and said down-converted signals to determine local zero-crossings differences.

13. The method of claim 12, wherein step (j) further comprises the steps:
  averaging the local zero-crossings differences and calculating the standard deviation;
  eliminating said local zero-crossing differences which are outside of two standard deviations of said mean value;
  averaging the remaining said local zero-crossing differences to determine a computed zero-crossings difference.

14. The method of claim 1 wherein step (d) comprises a single sideband technique.

15. The method of claim 1 wherein step (j) further comprises calculating the fluorescence lifetime of said sample.

16. A phase fluorometer comprising:
  first signal generating means for generating a sample baseband signal having a first frequency $f_o$ greater than 10 Hz and a reference signal correlated to said sample baseband signal;
  second signal generating means for generating a carrier signal having a second frequency f greater than 1 MHz;
  up-converting means for combining said sample baseband signal and said carrier signal to form an up-converted sample signal having an up-converted frequency $f \pm f_o$ equal to the sum or difference of said first and second frequencies;
  light source means modulatable at said up-converted frequency $f \pm f_o$ for generating modulated excitation light to illuminate a sample;
  photo detector means for detecting an emission from a sample excited by said modulated excitation light and converting said emission into an electrical signal;
  down-converting means for combining said carrier signal and said electrical signal to form a down-converted signal which contains phase and modulation information introduced by the sample; and
  processing means for processing down-converted signal and said reference signal.

17. The phase fluorometer of claim 16 wherein said light source means comprises a light emitting diode.

18. The phase fluorometer of claim 16 wherein said light source means comprises a laser diode.

19. The phase fluorometer of claim 16 wherein said first frequency $f_o$ is in the range of 10 Hz to 20 KHz.

20. The phase fluorometer of claim 16 wherein said second frequency f is in the range of 10 MHz to 300 MHz.

21. The phase fluorometer of claim 16 wherein said sample baseband signal comprises an in-phase baseband signal and a quadrature baseband signal, and wherein said up-converting means comprises first phase splitter means for splitting said carrier signal into an in-phase carrier signal and a quadrature carrier signal, first mixer means for mixing said in-phase carrier signal and one of said quadrature baseband signal and said in-phase baseband signal to form a first mixed signal, second mixer means for mixing said quadrature carrier signal and the other of said quadrature baseband signal and said in-phase baseband signal to form a second mixed signal, and combiner means for combining said first and second mixed signals to form said up-converted sample signal.

22. The phase fluorometer of claim 16 wherein said sample baseband signal comprises an in-phase baseband signal and a quadrature baseband signal, wherein said carrier signal comprises an in-phase carrier signal and a quadrature carrier signal, and wherein said up-converting means comprises first mixer means for mixing said in-phase carrier signal and one of said quadrature baseband signal and said in-phase baseband signal to form a first mixed signal, second mixer means for mixing said quadrature carrier signal and the other of said quadrature baseband signal and said in-phase baseband signal to form a second mixed signal, and combiner means for combining said first and second mixed signals to form said up-converted sample signal.

23. The phase fluorometer of claim 16 wherein said up-converting means combines said sample baseband signal and said carrier signal by a single sideband technique.

24. The phase fluorometer of claim 16 wherein said photo detector means comprises a photo multiplier tube.

25. The phase fluorometer of claim 16 wherein said reference signal is a reference clock signal, and said first signal generating means transmits said reference clock signal to said processing means.

26. The phase fluorometer of claim 16 wherein said processing means further comprises calculating means for calculating the fluorescence lifetime of the sample.

27. An instrument for detecting a phase shift comprising:
  first signal generating means for generating a sample baseband signal comprising a pair of waves and having a first frequency $f_o$, and a reference clock signal synchronized to said sample baseband signal;
  second signal generating means for generating a carrier signal having a second frequency f;
  up-converting means for combining said sample baseband signal and said carrier signal to form an up-converted sample signal having an up-converted frequency $f \pm f_o$ equal to the sum or difference of said first and second frequencies;
  light source means modulatable at said up-converted frequency $f \pm f_o$ for generating modulated excitation light to illuminate a sample;
  photo detector means for detecting an emission from a sample excited by said modulated excitation light, and converting said emission into an electrical signal;

down-converting means for combining said carrier signal and said electrical signal to form a down-converted signal which contains phase and modulation information introduced by the sample; and processing means for digitally processing said reference clock signal and said down-converted signal to calculate the phase shift of said sample.

28. The instrument of claim 27 wherein said pair of waves of said sample baseband signal is sinusoids in quadrature.

29. A method of measuring the phase of a sample signal relative to a reference signal comprising:

(a) generating a sample baseband signal having a first predetermined frequency $f_o$ which is greater than 10 Hz;

(b) generating a reference signal correlated to said baseband sample signal;

(c) generating a carrier signal having a second predetermined frequency f which is greater than 1 MHz;

(d) combining said carrier signal f and said sample baseband signal $f_o$ to form an up-converted signal having a frequency $f \pm f_o$ equal to the sum or difference of said first and second frequencies;

(e) modulating a light source with said carrier signal to form modulated excitation light;

(f) illuminating a sample with said modulated excitation light;

(g) detecting an emission from said sample;

(h) generating an electrical signal indicative of said emission;

(i) combining said electrical signal and said up-converted signal to form a down-converted signal at the baseband frequency which contains the phase and modulation information introduced by the sample; and (j) processing said down-converted signal and said reference signal.

30. The method of claim 29 wherein said reference signal and said sample baseband signal have the same frequency.

31. The method of claim 29 wherein step (j) further comprises calculating the fluorescence lifetime of said sample.

32. A phase fluorometer comprising:

first signal generating means for generating a sample baseband signal having a first frequency $f_o$ greater than 10 Hz and a reference signal correlated to said sample baseband signal;

second signal generating means for generating a carrier signal having a second frequency f greater than 1 MHz;

up-converting means for combining said sample baseband signal and said carrier signal to form an up-converted signal having an up-converted frequency $f \pm f_o$ equal to the sum or difference of said first and second frequencies;

light source means modulatable at said carrier frequency for generating modulated excitation light to illuminate a sample;

photo detector means for detecting an emission from a sample excited by said modulated excitation light and converting said emission into an electrical signal;

down-converting means for combining said up-converted signal and said electrical signal to form a down-converted signal which contains phase and modulation information introduced by the sample; and processing means for processing down-converted signal and said reference signal.

33. The phase fluorometer of claim 32 wherein said light source means comprises a light emitting diode.

34. The phase fluorometer of claim 32 wherein said light source means comprises a laser diode.

35. The phase fluorometer of claim 34 wherein said up-converting means combines said baseband signal and said carrier signal by a single sideband technique.

36. The phase fluorometer of claim 32 wherein said reference signal is a reference clock signal, and said first signal generating means transmits said sample clock signal to said processing means.

* * * * *

UNITED STATES PATENT AND TRADEMARK OFFICE
CERTIFICATE OF CORRECTION

PATENT NO. : 5,818,582
DATED : October 6, 1998
INVENTOR(S) : Fernandez et al.

It is certified that error appears in the above-identified patent and that said Letters Patent is hereby corrected as shown below:

<u>Column 1</u>,
Insert the following after line 14,
-- Government Interests
This invention was made with Government support under N00014-95-C-0316, awarded by the Office of Naval Research. The Government has certain rights in the invention. --

Signed and Sealed this

Twenty-third Day of July, 2002

Attest:

Attesting Officer

JAMES E. ROGAN
*Director of the United States Patent and Trademark Office*